May 11, 1926.

C. WILLIAMS

DRINKING FOUNTAIN

Filed July 31, 1925

1,583,865

Inventor
Clarence Williams
By C.A.Snow&Co
Attorneys.

Patented May 11, 1926.

1,583,865

UNITED STATES PATENT OFFICE.

CLARENCE WILLIAMS, OF REEDS, MISSOURI.

DRINKING FOUNTAIN.

Application filed July 31, 1925. Serial No. 47,324.

This invention relates to drinking fountains for poultry and more particularly to vacuum feed fountains of this character.

The object of the invention is to provide a simple and efficient vacuum feed fountain which is absolutely sanitary and which is readily portable from place to place.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figures 1, 2:
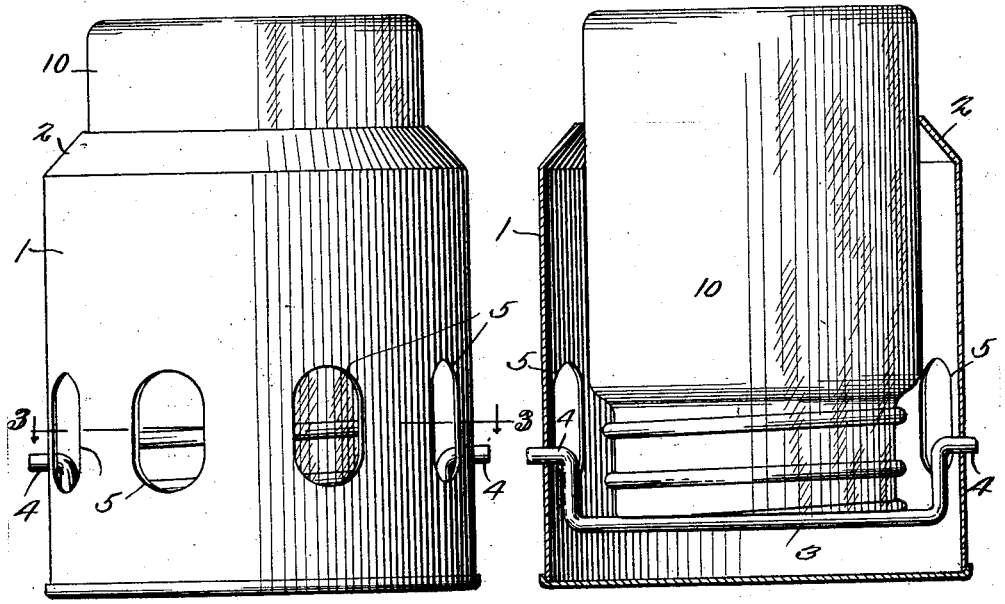
Figure 1 represents a side elevation of a fountain constructed in accordance with this invention with the water container shown removed.
Figure 2 is a vertical section with the container in position and shown in side elevation.
Figure 3:
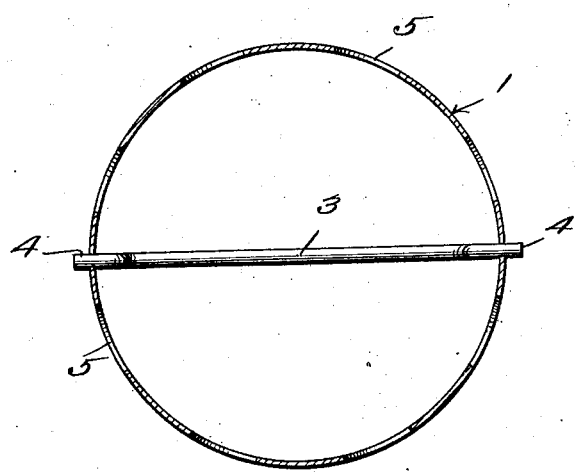
Figure 3 is a horizontal section taken on the line 3—3 of Figure 1.

The fountain constituting this invention comprises a sheet metal tank 1 of any desired size and shape having a closed bottom and an inturned inclined flange 2 at its upper end to receive a water container 10 which is preferably in the form of a glass jar inverted and having the mouth thereof supported on a cross wire 3 supported in the lower portion of the tank 1 and here shown in the form of a crank having its ends 4 journaled in the side walls of said tank. This tank is also provided with a plurality of peripherally spaced openings 5 any desired number of which may be employed and which may be of any desired size according to the poultry to be watered, whether baby chicks or older fowl. The cross bar 3 extends below the bottom portions of these openings 5 and supports the ends of the container 10 which is submerged in water in the tank and thus produces a vacuum feed fount of this character. As the water is consumed through the openings 5 the vacuum will be broken and water flow out from the container 10 into the tank.

By having these openings 5 in the side walls of the tank 1 it is impossible for the poultry to contaminate the water thus ensuring a sanitary fountain of this character.

The cross rod or bar 3 may have its position regulated to suit the size of the fountain and the rapidity with which it is desired to feed the water.

I claim:—

In a fountain of the class described, a tank including a body portion having straight side walls terminating in inwardly extended upper ends, a rod having upwardly and outwardly extended ends, said tank having openings to receive the outwardly extended ends of the rod, and a jar having its open end resting on the rod at a point below the ends of the rod, and the straight side walls of the body portion having openings to permit access to the interior thereof.

In testimony that I claim the foregoing as my own, I have hereto affixed my signature.

CLARENCE WILLIAMS.